(No Model.)

S. E. TOUCEY.
GRAPE SEED EXTRACTOR.

No. 381,657. Patented Apr. 24, 1888.

WITNESSES:

INVENTOR:
S. E. Toucey
BY Munn & Co
ATTORNEYS.

UNITED STATES PATENT OFFICE.

SARAH E. TOUCEY, OF NEW YORK, N. Y.

GRAPE-SEED EXTRACTOR.

SPECIFICATION forming part of Letters Patent No. 381,657, dated April 24, 1888.

Application filed February 18, 1888. Serial No. 264,332. (No model.)

*To all whom it may concern:*

Be it known that I, SARAH E. TOUCEY, of the city, county, and State of New York, have invented a new and useful Improvement in Grape-Seed Extractors, of which the following is a full, clear, and exact description.

This invention relates to an improvement in utensils for extracting the seeds from grapes previous to eating them, in which are combined with a handle a knife for cutting off the tops of the grapes, so as to lay bare the seeds, and a pick for taking out the seeds.

The object of the improvement is to secure the greatest attainable efficiency and convenience in use with simplicity and presentability; and to this end the invention consists of a utensil constructed and adapted for use substantially as hereinafter described and as claimed.

Reference is to be had to the accompanying drawings, forming a part of this specification, in which similar letters of reference indicate corresponding parts in both figures.

Figure 1:
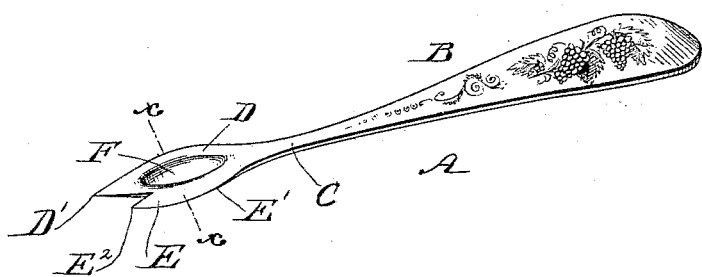
Figure 2:
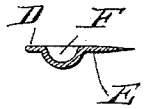

Figure 1 is a perspective view of a utensil embodying my improvement. Fig. 2 is a cross-sectional view of the same on the line $x$ $x$, Fig. 1.

The grape seed extractor A is by preference cut and stamped from a single thin piece of hard metal, and is formed with a tapering handle, B, terminating in a neck, C, a sharp-pointed pick, D, and a sharp-edged cutting-blade, E. The sharp point D' of the pick D is in line with the handle, and the pick is widened about evenly from both the neck C and its point D to its middle. The upper and lower faces of the pick are flat, except at the middle, where the metal is depressed to form a terminating groove, F, in its top. The cutting-blade projects from the side edge of the flat pick, its sharpened outer edge, E', vanishing by a gradual curve in the corresponding edge of the neck C, and its pointed extremity $E^2$ forking out from the pick a short distance within the point D' thereof to avoid interference with the proper use of said point.

With this utensil the top of the grape can be quickly sliced off by the cutting-blade E, so as to uncover the grape seeds, and by introducing the flat-pointed pick beneath the seeds they can be readily received in the groove F and removed without destroying the edible part of the grape.

Having thus described my invention, what I claim as new, and desire to secure by Letters Patent, is—

1. A grape-seed extractor consisting of a handle, a flat-pointed pick having a groove in its upper face, and a lateral cutting-blade, substantially as described.

2. A grape-seed extractor consisting of a handle, a flat pick having a sharpened point on its end in line with the handle and a groove in its top face, and a cutting-blade projecting laterally from the pick, and its point forking out therefrom a short distance within the point of the pick, substantially as described.

SARAH E. TOUCEY.

Witnesses:
CLARENCE L. BURGER,
C. SEDGWICK.